United States Patent
McLaren et al.

(10) Patent No.: US 6,678,712 B1
(45) Date of Patent: Jan. 13, 2004

(54) METHOD AND SYSTEM FOR EXECUTING A PROGRAM UNDER ONE OF A PLURALITY OF MUTUALLY EXCLUSIVE OPERATING ENVIRONMENTS

(75) Inventors: Wayne A. McLaren, Coral Springs, FL (US); Anthony Ingenoso, Lakeworth, FL (US); Paul C. Perritt, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 08/588,942

(22) Filed: Jan. 19, 1996

(51) Int. Cl.[7] .................................................. G06F 9/00
(52) U.S. Cl. ........................ 709/100; 709/102; 709/106
(58) Field of Search .......................... 395/670; 709/100, 709/101, 102, 103, 104, 105, 106

(56) References Cited

U.S. PATENT DOCUMENTS

| | | | |
|---|---|---|---|
| 4,493,034 A | * 1/1985 | Angelle et al. .............. 364/200 |
| 4,675,814 A | 6/1987 | Murai et al. |
| 4,722,048 A | 1/1988 | Hirsch et al. |
| 4,747,040 A | 5/1988 | Blanset et al. |
| 4,799,145 A | * 1/1989 | Goss et al. .................. 364/200 |
| 5,175,853 A | 12/1992 | Kardach et al. |
| 5,278,973 A | 1/1994 | O'Brien et al. |
| 5,291,604 A | 3/1994 | Kardach et al. |
| 5,297,282 A | 3/1994 | Mailak et al. |
| 5,301,277 A | 4/1994 | Kanai |
| 5,339,437 A | 8/1994 | Yuen |
| 5,359,730 A | 10/1994 | Marron |
| 5,379,431 A | 1/1995 | Lemon et al. |
| 5,379,435 A | 1/1995 | Hanaoka |
| 5,381,549 A | * 1/1995 | Tamura ....................... 395/700 |
| 5,396,635 A | 3/1995 | Fung |
| 5,404,544 A | 4/1995 | Crayford |
| 5,414,851 A | 5/1995 | Brice, Jr. et al. |
| 5,485,606 A | * 1/1996 | Midgdey et al. ............. 395/600 |
| 5,696,975 A | * 12/1997 | Moore et al. ................ 395/712 |
| 5,715,464 A | * 2/1998 | Crump et al. ................ 395/750 |

OTHER PUBLICATIONS

Cutler et al, SCO UNIX in a Nutshell, pp. 69,139, 144–145.*
Gittins et al., "UNIX User Area In OS/2," IBM Technical Disclosure Bulletin, vol. 36, No. 1, Jan. 1993, p. 43.
Anschuetz et al., "Multiple Bootable Operating System," IBM Technical Disclosure Bulletin, vol. 35, No. 1A, Jun. 1992, pp. 311–314.
Swanberg, "Operating System and Machine . . . ", IBM Technical Disclosure Bulletin, vol. 38, No. 05, May 1995, pp. 143–144.

* cited by examiner

*Primary Examiner*—Majid A. Banankhai (57) ABSTRACT

A method and system within a data processing system for executing a program under one of a number of mutually exclusive operating systems are disclosed. The data processing system includes a nonvolatile mass storage device, a volatile memory, and a processor. According to the present invention, a program which executes under a second operating system is invoked while the processor is executing a first operating system. In response to invocation of the program, the data processing system is forced to a quiescent state. A state of the first operating system is then determined from contents of the volatile memory and stored within either the volatile memory or the nonvolatile mass storage device. In response to storage of the state of the first operating system, at least a portion of the second operating system is automatically loaded into the volatile memory. Thereafter, the program is executed under the second operating system, wherein interchange between mutually incompatible operating systems within a single data processing system is efficiently accomplished. In a preferred embodiment of the present invention, the method of the present invention is embodied within a computer program product for causing a data processing system to perform the foregoing steps.

42 Claims, 8 Drawing Sheets

METHOD AND SYSTEM FOR EXECUTING A PROGRAM UNDER ONE OF A PLURALITY OF MUTUALLY EXCLUSIVE OPERATING ENVIRONMENTS

BACKGROUND OF THE INVENTION

1. Technical Field

The present invention relates in general to a method and system for data processing and in particular to a method and system for executing a program within a data processing system under one of a plurality of mutually exclusive operating systems. Still more particularly, the present invention relates to a method and system for executing a program within a data processing system which hibernate a primary operating system in response to invocation of a program which requires a secondary operating system.

2. Description of the Related Art

As computer operating system technology advances, continued support of the vast body of existing software becomes increasingly difficult. For example, current state-of-the-art multithreaded, multitasking operating systems such as OS/2™ have some difficulty in supporting programs developed for a previous generation of operating system, such as DOS. The difficulty current operating systems encounter in supporting programs written for prior operating systems arise chiefly due to the fact that the programs, when written, were targeted for use within a single-user computer system running a single-threaded operating system. Because these computer systems are capable of running only a single execution thread for a single user, rules of acceptable policy within the computer system are often nonexistent. To take advantage of the performance benefits which result from unlimited software control of system operations, programs written for such an environment often contain their own device drivers and directly manage system hardware, for example, interval timers. In fact, such programs often do not run correctly if other device drivers (i.e., operating system device drivers) are already loaded within the computer system.

In contrast to such prior operating system environments, current multithreaded, multitasking operating systems run in a protected environment, for example, the protected mode supported by 80×86 processors, which enables system resources to be shared concurrently by multiple tasks and which prevents a particular task from monopolizing the system resources. Thus, a problem arises when attempting to run programs written for prior generation single-threaded operating systems which directly and often exclusively manage system hardware. Because of the conflict between the exclusive control of system resources required by the single-user, single-threaded prior generation operating systems and current multithreaded, multitasking operating systems, programs which require the single-threaded operating systems cannot be run as a task under current multithreaded, multitasking operating systems.

Accordingly, several schemes have been developed to support applications which required a single-user, single-threaded operating system environment. A first scheme involves partitioning the primary boot device (e.g., hard disk drive) and installing single-threaded and multithreaded operating systems within separate partitions. A operating system boot manager queries a user upon startup which operating system is preferred. Thereafter, the user must reboot the computer to switch between the multiple operating systems as required by the applications to be executed. Thus, in a typical computing scenario, the user boots a first operating system to run a first program, exits the first operating system, and then boots a second operating system to execute a second program. This scheme provides less than desirable performance due to the time required to boot an operating system prior to launching particular applications.

A similar scheme utilized to support multiple incompatible operating systems is called a "dual boot." In a dual boot scenario, two operating systems and their associated initialization files may be stored within the same hard disk partition. In response to a user command to boot the alternate operating system, the boot block and initialization files (CONFIG.SYS file and AUTOEXEC.BAT) of the current operating system are stored with modified file extensions (e.g., CONFIG.DOS) and the boot block and initialization files of the alternate operating system are renamed to the specified system names. When the data processing system is subsequently reset, the alternate operating system will boot. The dual boot scheme suffers the same disadvantage as the partitioned disk scheme in that the delay encountered when launching particular applications is unacceptably long because of the additional time required to boot the appropriate operating system.

Consequently, it would be desirable to provide an improved method and system for executing a program within a data processing system under one of a plurality of mutually exclusive operating systems. In particular, it would be desirable to provide a method and system which efficiently facilitate execution of a program requiring a different operating environment.

SUMMARY OF THE INVENTION

It is therefore one object of the present invention to provide an improved method and system for data processing.

It is another object of the present invention to provide an improved method and system for executing a program within a data processing system under one of a plurality of mutually exclusive operating environments.

It is yet another object of the present invention to provide an improved method and system for executing a program within a data processing system which hibernate a primary operating system in response to invocation of a program which requires a secondary operating system or an unrestricted operating environment.

It is still another object of the present invention to provide a method and system for hibernating the primary operating system of a data processing system and loading a secondary operating system or unrestricted operating environment in a manner which is transparent to the user.

The foregoing objects are achieved as is now described. A method and system within a data processing system for executing a program under one of a number of mutually exclusive operating systems are disclosed. The data processing system includes a nonvolatile mass storage device, a volatile memory, and a processor. According to the present invention, a program which executes under a second operating system is invoked while the processor is executing a first operating system. In response to invocation of the program, the data processing system is forced to a quiescent state. A state of the first operating system is then determined from contents of the volatile memory and stored within either the volatile memory or the nonvolatile mass storage device. In response to storage of the state of the first operating system, at least a portion of the second operating system is automatically loaded into the volatile memory.

Thereafter, the program is executed under the second operating system, wherein interchange between mutually incompatible operating systems within a single data processing system is efficiently accomplished. In a preferred embodiment of the present invention, the method of the present invention is embodied within a computer program product for causing a data processing system to perform the foregoing steps.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
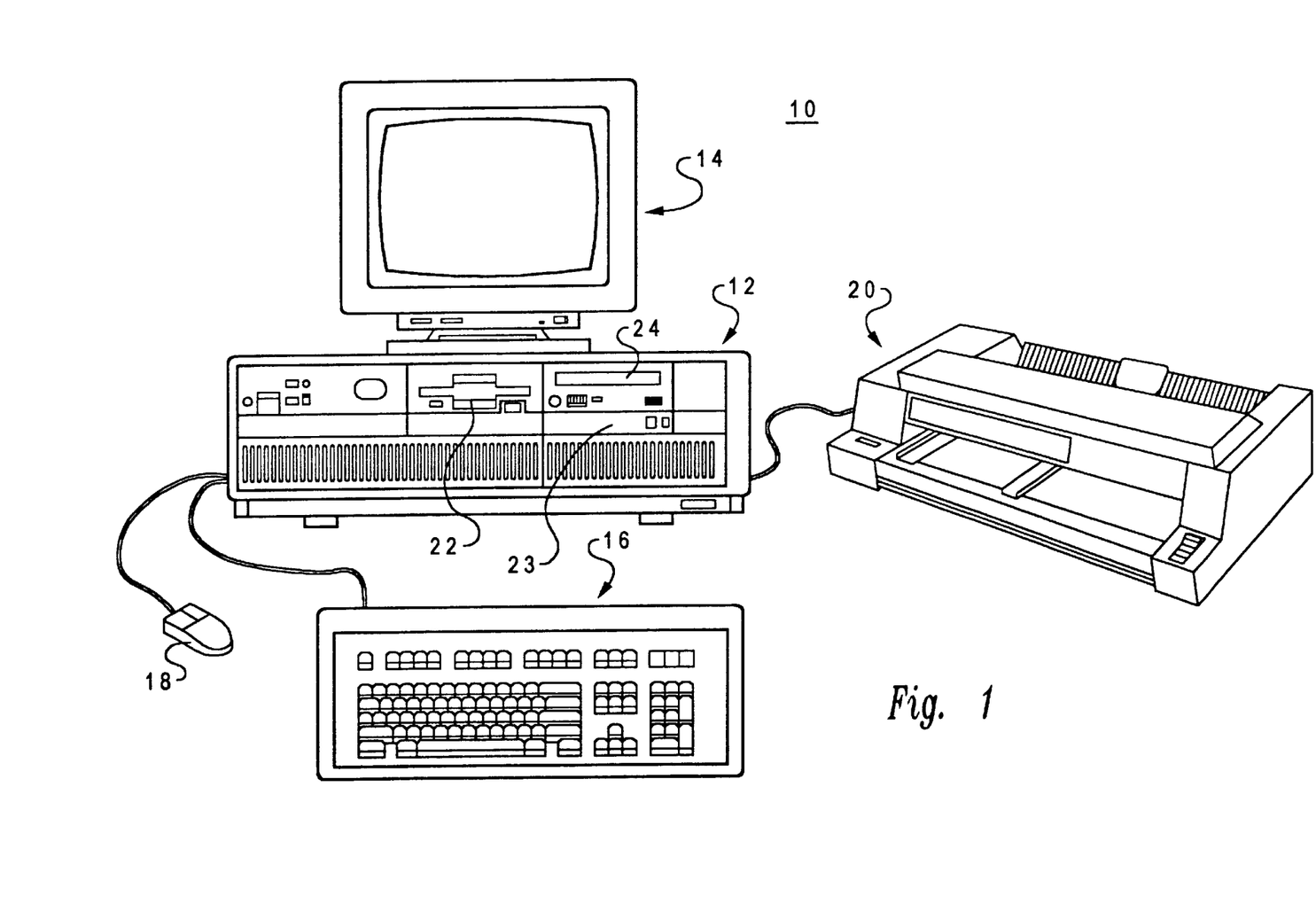
FIG. 1 illustrates a preferred embodiment of a data processing system which may be utilized to implement the method of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data from input devices such as keyboard 16, mouse 18, or local area networking interfaces (not illustrated). Mouse 18 is preferably utilized in conjunction with a graphical user interface (GUI) in which system objects, including data processing system components and application programs, may be manipulated by mouse 18 through the selection and movement of associated graphical objects displayed within display device 14. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12 for interaction therewith.

Figure 2:
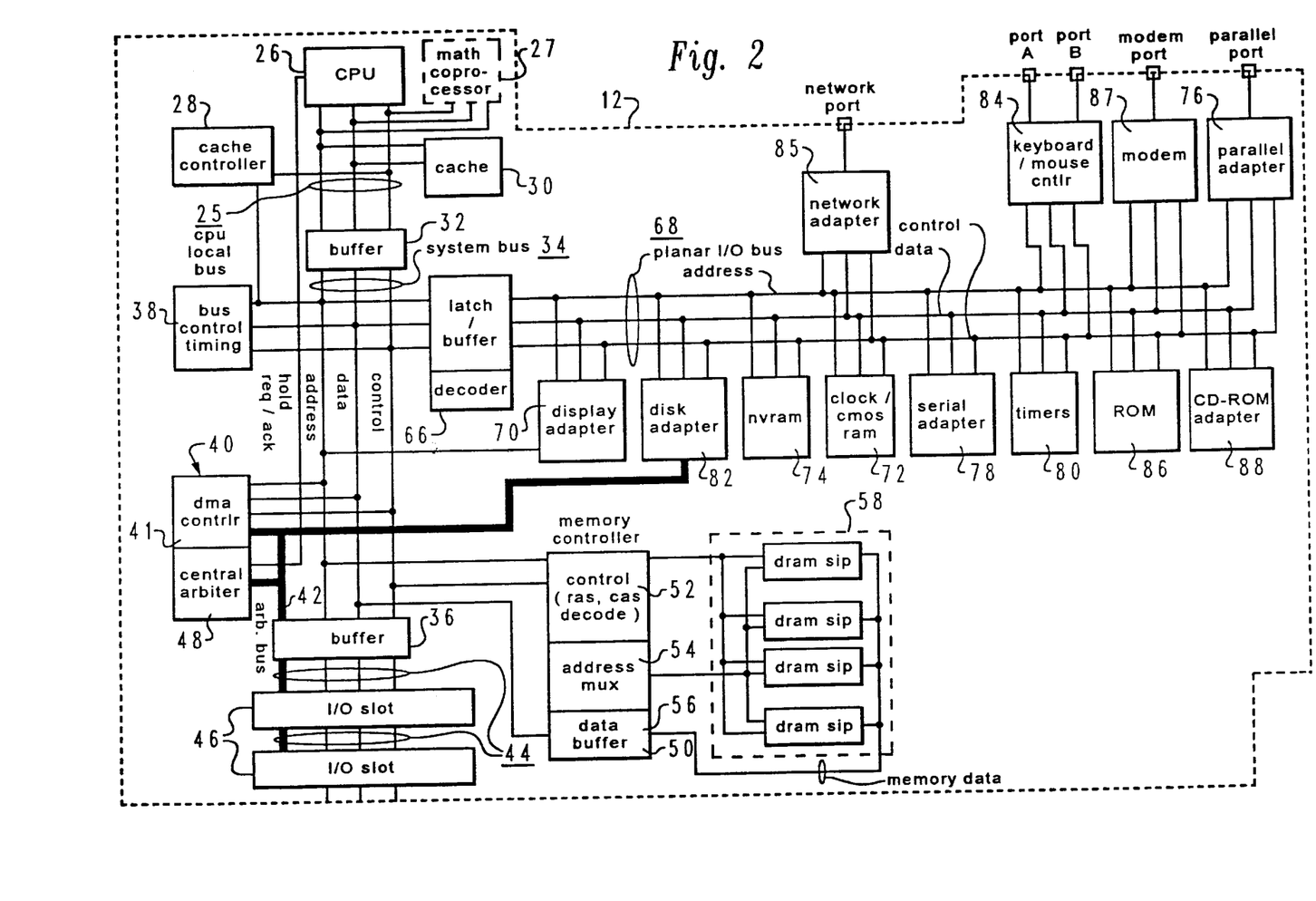
FIG. 2 depicts a block diagram of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 could be implemented as one of the 80×86 microprocessors, which are available from a number of vendors.

In addition to CPU 26, an optional math coprocessor 27, cache controller 28, and cache 30 are coupled to a high-speed CPU local bus 25. Math coprocessor 27 is an optional processor, distinct from CPU 26, that performs numeric calculations with greater efficiency than CPU 26. Math coprocessor 27 is optional since the performance advantage provided by math coprocessors 27 may be achieved by enhancements to CPU 26, such as the addition of multiple floating-point execution units. Cache 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages, which each contain a uniform number of virtual memory addresses. When the execution of software requires more pages of virtual memory that can be stored within RAM 58, pages that are not currently needed are paged out and the required pages are paged into RAM 58.

Virtual memory pages are classified by memory control unit 50 as either free, resident, or swappable. Free pages contain no useful data and are available for storage of information. Resident pages, in contrast, must be retained within primary storage (i.e., RAM 58) because they contain data or instructions required for current processing. Swappable pages contain data that are not immediately required for current processing. The operating system of data processing system 10, which in a preferred embodiment of the present invention comprises OS/2 Warp, available from IBM Corporation, maintains a "swap" file within hard disk drive 23 to store swappable pages which are pages out of RAM 58. However, not all swappable pages that are paged from RAM 58 are stored within the swap file. If another copy of the swappable page exists, for example, within a file stored on hard disk drive 23, the virtual memory manager further classifies the swappable page as discardable. Thus, if a discardable swappable page is paged from RAM 58, the page is simply reclassified as free since a copy of the page already resides within hard disk drive 23.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and expansion bus 44. Connected to expansion bus 44 are a number of I/O slots 46 for receiving adapter cards, which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. A variety of I/O adapters and other peripheral components are attached to planar I/O bus 68, including display adapter 70, disk adapter 82, nonvolatile RAM 74, clock 72, parallel adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into video signals utilized to drive display device 14. Depending upon the operating system and application software running, the visual output displayed within display device 14 may include text, graphics, animation, and multimedia video. Disk adapter 82 controls the storage of data to and the retrieval of data from hard disk drive 23 and diskette drive 22. Disk adapter 82 also handles tasks such as positioning read/write heads within drives 22 and 23 and mediating between drives 22 and 23 and CPU 26. Non-volatile RAM 74 stores system configuration data that describes the present configuration of data processing system 10. For example, non-volatile RAM 74 contains information that describes the capacity of hard disk drive 23 or a diskette placed within diskette drive 22, the type of display device 14, the amount of RAM 58, and the present system configuration. These data remain stored in non-volatile RAM 74 when power is removed from data processing system 10.

Clock 72 is utilized by application programs executed by CPU 26 for time of day calculations. Serial adapter 78 facilitates synchronous and asynchronous serial communication between system unit 12 and other data processing systems or attached peripheral devices, such as printer 20. Similarly, modem 87 provides a serial interface that enables data processing system 10 to transmit and receive information over a standard telephone line. For example, modem 87 may be utilized to connect data processing system 10 to an on-line information service, such as the information service provided by Prodigy Services Corporation under the service mark "PRODIGY". Such on-line service providers offer software that can be downloaded into data processing system 10 via modem 87. In addition, modem 87 enables a user to access other sources of software, such as a server, an electronic bulletin board, and the Internet or World Wide Web. Timers 80 comprise multiple interval timers which may be utilized to time a number of events within data processing system 10. As described above, timers 80 are among the devices directly controlled by some application programs, particularly games, which were written for a single-threaded operating system environment.

ROM 86 typically stores a basic input/output system (BIOS) which provides user-transparent I/O when CPU 26 is operating under the DOS operating system. BIOS also includes power on self-test (POST) diagnostic routines which perform system set up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a pointing device, such as mouse 18. Parallel adapter 76 enables parallel communication of data between data processing system 10 and another data processing system or peripheral device. Finally, system unit 12 includes network adapter 85, which facilitates communication between data processing system 10 and other data processing systems, including computer networks, via a local area network (LAN).

As will be described in detail below, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-table storage media (e.g. read only memory devices within a computer such as ROM 86 or CD-ROM disks readable by CD-ROM drive 24); (b) information alterably stored on writable storage media (e.g., floppy disks within diskette drive 22 or hard disk drive 23); or (c) information conveyed to a computer through communication media, such as through a computer or telephone network. It should be understood, therefore, that such media, when carrying computer readable instructions that direct the method functions of the present invention, represent alternate embodiments of the present invention.

As is typical of many data processing systems, following power-on, the various hardware components of data processing system 10 will each execute its own internal reset procedures to regain a stable, known state. At the completion of these reset procedures, CPU 26 executes POST code within ROM 86 to initialize system hardware, setup the BIOS data area; and construct an interrupt vector table, as well as other tasks. Following POST, a "boot strap" or primary operating system loader is run to load segments of a primary operating system (OS) 88 (illustrated in FIG. 3) into RAM 58 and launch the execution of primary OS 88, which in a preferred embodiment of the present invention comprises OS/2 Warp.

Figure 3:
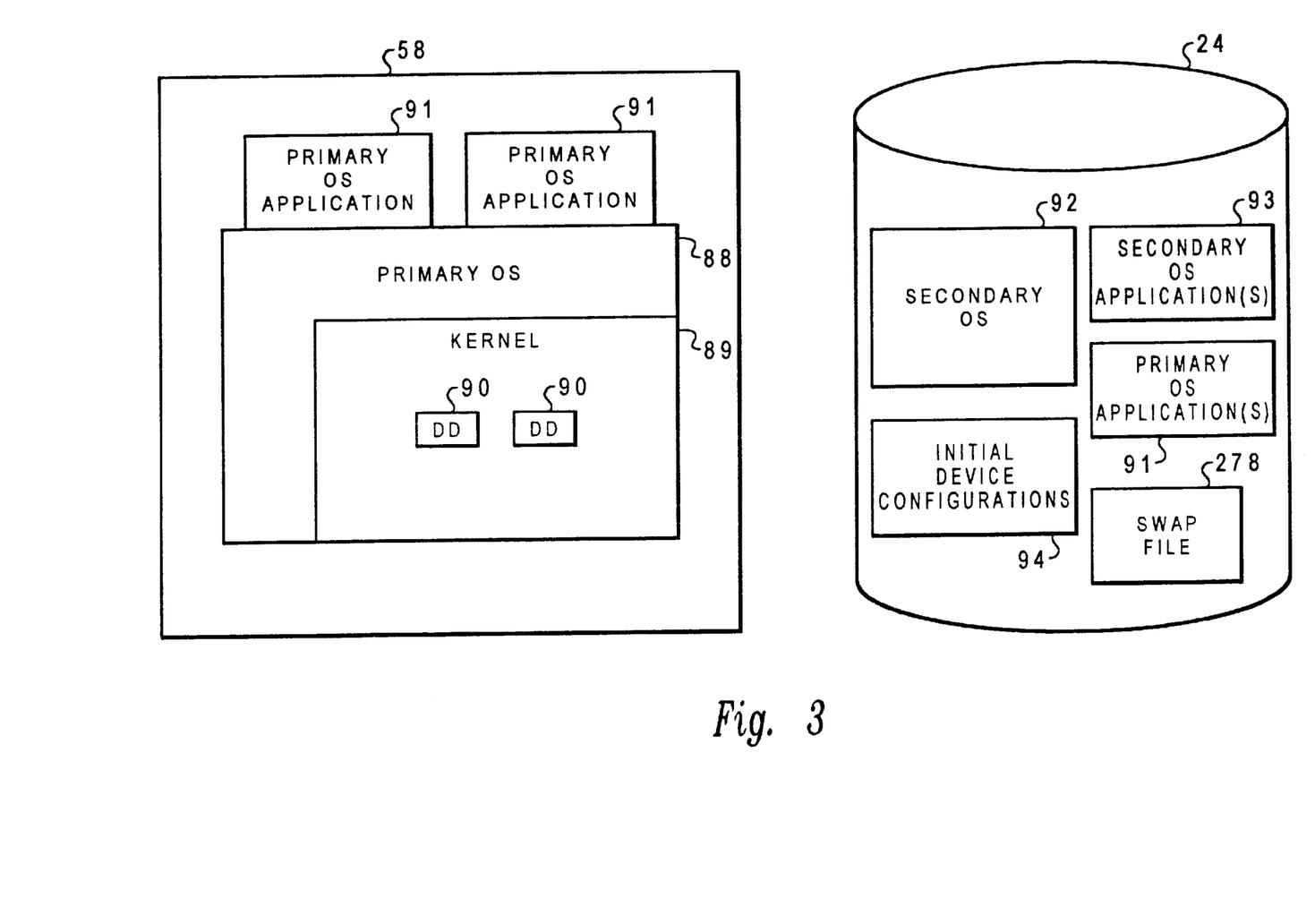
FIG. 3 illustrates the software configuration of a data processing system running a primary operating system.

With reference now to FIG. 3, there is illustrated a pictorial representation of the software configuration of data processing system 10 following power-on. As depicted, segments of primary OS 88, including kernel 89 and device drivers 90, are loaded into RAM 58. Kernel 89 controls the low-level operation of the hardware components of data processing system 10 through device drivers 90. Those skilled in the art will appreciate that primary OS 88 remains stored within hard disk drive 23 (or other boot device) and that portions of primary OS 88 will be loaded into cache 30 for efficient access by CPU 26. Following the launch of primary OS 88, a user may invoke one or more primary OS applications 91. As is understood by those skilled in the art, primary OS applications 91 access system resources through an application programming interface (API) with primary OS 88. According to the present invention, in addition to primary OS 88, data processing system 10 has a secondary OS 92 stored within hard disk drive 23, which could comprise either a conventional operating system such as DOS or Microsoft Windows™ or alternatively a control program that requires an unrestricted operating environment for execution. Therefore, it will be understood that as utilized hereinafter the term secondary OS will refer to either a conventional operating system or a control program. Hard disk drive 23 also stores one or more secondary OS applications 93, which operate inefficiently or not at all under primary OS 88.

Because of potential differences between the hardware management policies of primary OS 88 and secondary OS 92, when primary OS 88 first boots, primary OS 88 stores the initial settings of the various hardware components of data processing system 10 within hard disk drive 23 as inital device configurations 94. As will be described below, when imary OS 88 and secondary OS 92 are interchanged according to the method of the present invention, initial device configurations 94 are restored to the hardware components of data processing system 10 prior to booting secondary OS 92 in order to set the hardware components to a state which is assumed to exist by secondary OS 92 at startup.

Figure 4:
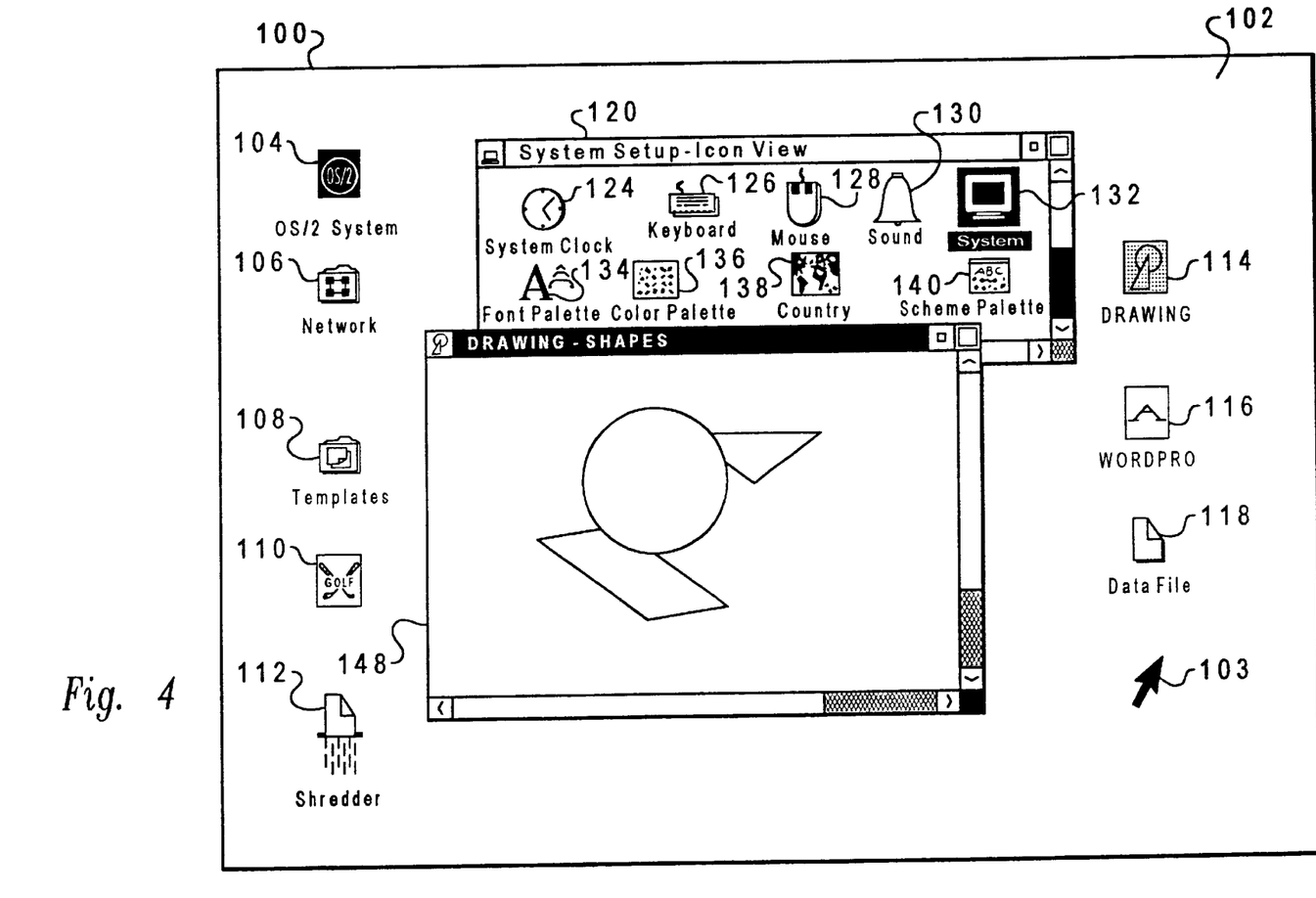
FIG. 4 depicts application windows and icons displayed on the desktop of a data processing system running the primary operating system.

Referring now to FIG. 4, there is depicted a preferred embodiment of the graphical user interface (GUI) employed by primary OS 88. Screen 100 is displayed to a user within display device 14 and includes a background desktop 102 upon which a plurality of user-selectable icons 104–118 are displayed. Each icon 104–118 represents an application, function or file storage area which a user can conveniently select utilizing graphical pointer 103 by double-clicking the left button of mouse 18. When a user selects one of icons 104–118, the function corresponding to the selected icon is activated and the selected icon is highlighted. Many of icons 104–118 have an associated window or series of windows that are displayed when the icon is selected. For example, when OS/2 System icon 104 is selected, system setup window 120 is displayed to the user to provide further possible selections (i.e., icons 124–140). In the depicted example, drawing icon 114, which represents a computer-aided drafting program, is also selected. Accordingly, drawing window 148 is also displayed to the user on desktop 102.

The computer-aided drafting program is one of primary OS application 91, which runs under primary OS 88.

According to the present invention, icons representing secondary OS applications 93 are also displayed on desktop 102. For example, golf icon 110 represents a golf game, which a user can invoke by selecting golf icon 110 utilizing graphical pointer 103. According to an important aspect of the present invention, and as described in greater detail below, when a user invokes one of secondary OS applications 93, data processing system 10 interchanges primary OS 88 and secondary OS 92 and executes the selected secondary OS application 93 under secondary OS 92. However, from the user's perspective, the secondary OS application 93 appears to be running under primary OS 88 due to the seamless substitution of the operating systems. When execution of secondary OS application 93 terminates, primary OS 88 is restored and desktop 102 is again displayed to the user in the same state in which desktop 102 appeared prior to the invocation of secondary OS application 93.

Figure 5:
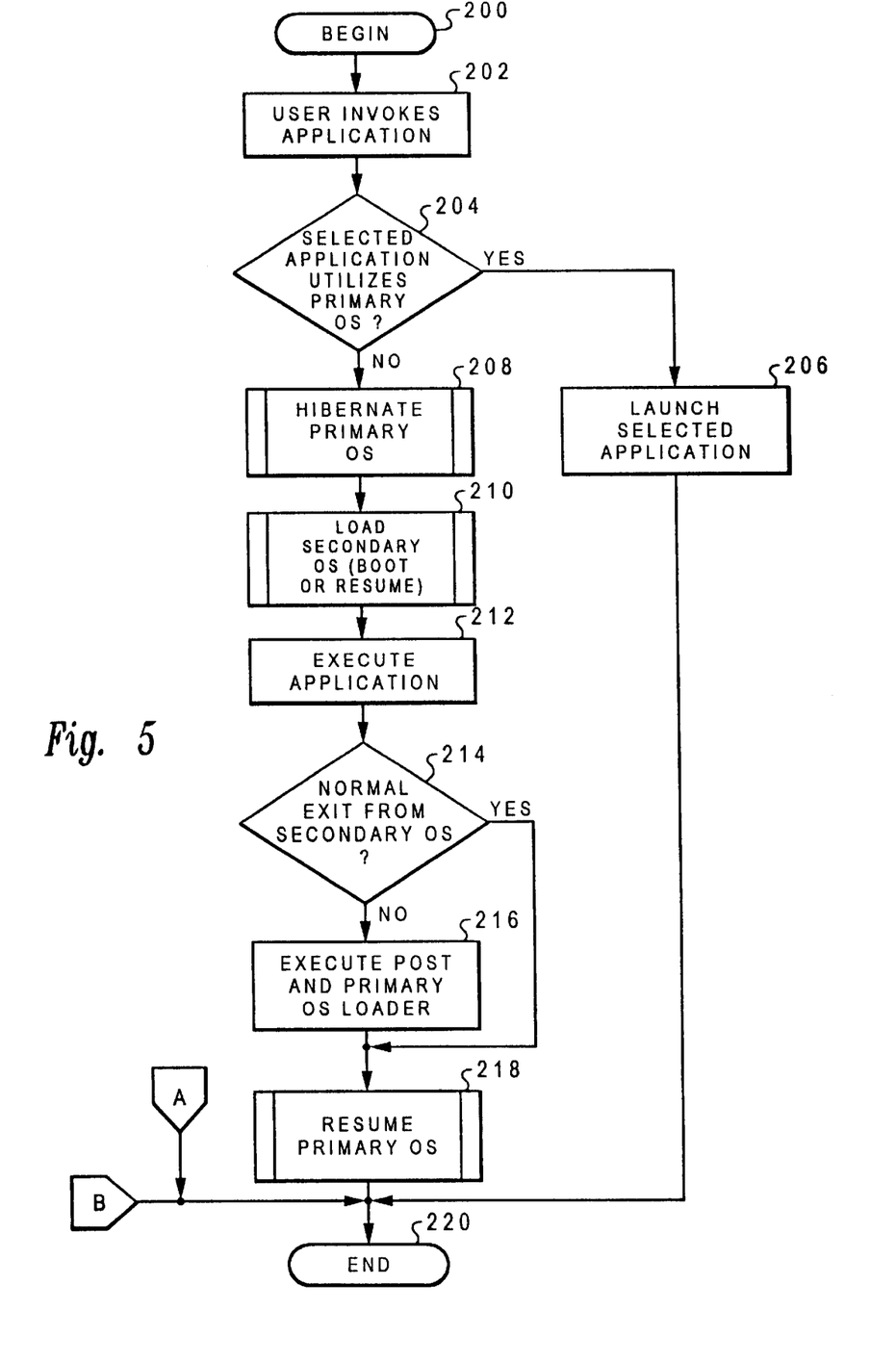
FIG. 5 is a flowchart illustrating a preferred embodiment of the method of interchanging operating systems within a data processing system according to the present invention.

With reference now to FIG. 5, there is depicted a flowchart of a preferred embodiment of the method utilized by the present invention to execute a program under a secondary operating system by hibernating a primary operating system. According to the present invention, hibernation of an operating system signifies that work in progress by the operating system is temporarily suspended, not terminated, and that the software state of the data processing system is saved until subsequent restoration of the operating system. When the process begins at block 200, data processing system 10 is in the state illustrated in FIGS. 3 and 4. That is, data processing system 10 is running primary OS 88 with possibly one or more primary OS applications 91 executing under primary OS 88. The process proceeds from block 200 to block 202, which illustrates a user invoking an application by selecting one of icons 104–118 utilizing graphical pointer 103. A determination is then made at block 204 whether or not the selected application utilizes primary OS 88. The determination illustrated at block 204 is made by interrogating an attribute associated with the selected icon by the GUI of primary OS 88. If a determination is made at block 204 that the application utilizes primary OS 88, the process proceeds to block 206, which depicts launching the selected application in the usual manner. Thereafter, the process terminates at block 220. For example, if the user selects WordPro™ icon 116, the WordPro™ word processing application associated with WordPro™ icon 116 begins execution under primary OS 88 and a window associated with the word processing application is displayed on desktop 102.

Returning to block 204, if a determination is made that the selected application requires secondary OS 92 to execute (i.e., the selected application is one of secondary OS applications 93), the process proceeds to block 208, which depicts hibernating primary OS 88. For example, if a user selects golf icon 110, which is one of secondary OS applications 93, the process passes from block 204 to block 208. In order to maintain transparency following a "no" decision at block 204, screen 100 is preferably painted with a "mumble" screen that indicates to the user that the selected application is being launched.

Figure 6:
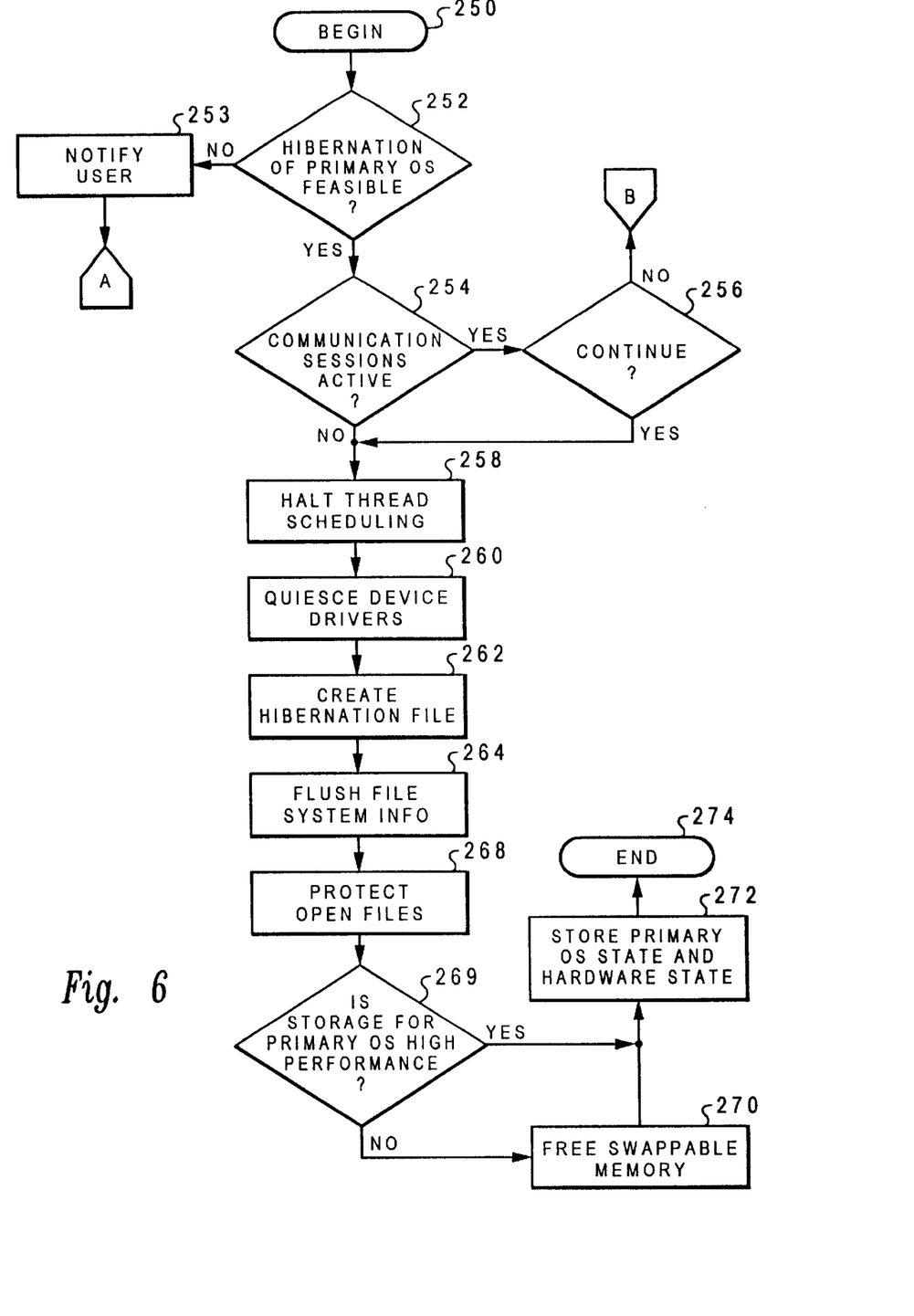
FIG. 6 is a flowchart depicting a preferred embodiment of the method utilized by the present invention to hibernate the primary operating system within storage.

Referring now to FIG. 6, there is depicted a more detailed flowchart of the method utilized by the present invention to hibernate the primary operating system. As depicted, the process begins at block 250 and thereafter proceeds to block 252, which illustrates determining whether a hibernation of primary OS 88 to either hard disk drive 23 or RAM 58 is feasible. The determination made at block 252 includes determining whether or not hard disk drive 23 or RAM 58 has sufficient space to store the state of primary OS 88 in addition to the hardware state of data processing system 10 and additional control information. If a determination is made that hibernating primary OS 88 is infeasible, the process proceeds to block 253, which depicts notifying the user that execution of the selected secondary OS application 93 is not currently possible. Thereafter, the process proceeds through page connector A to block 220 of FIG. 5, where the process terminates and desktop 102 returns to the state illustrated in FIG. 4. Referring again to FIG. 6, if a determination is made at block 252 that hibernation of primary OS 88 is feasible, the process proceeds to block 254, which illustrates determining whether any communication sessions, for example, via network adapter 85 or serial adapter 78, are active. If the user has one or more active communication sessions, the process proceeds to block 256, which depicts prompting the user to indicate whether the user desires to end the active communication sessions and launch the selected secondary OS application 93 or to abort the selected secondary OS application 93. If the user elects to discontinue the launch of the selected secondary OS application 93, the process passes through page connector B to block 220 of FIG. 5, where the process terminates, again returning desktop 102 to the state depicted in FIG. 4. However, if the user elects to continue launch of the selected secondary OS application 93, the active communication sessions are terminated and the process passes to block 258.

Block 258 illustrates primary OS 88 halting scheduling of threads for execution by CPU 26. Halting thread scheduling by CPU 26 grants the hibernation process depicted in FIG. 6 exclusive use of all system resources, thereby enabling a consistent state of primary OS 88 to be acquired. Next, the process passes to block 260, which illustrates quiescing device drivers 90 within primary OS kernel 89. Thus, at block 260 communication between primary OS 88 and the hardware components of data processing system 10 is suspended. The process then passes to block 262, which depicts creating a hibernation file within hard disk drive 23 or RAM 58. According to a preferred embodiment of the present invention, hibernation file 276 (illustrated in FIG. 8), which stores control information and the hardware state of data processing system 10 during hibernation, consumes space on hard disk drive 23 or RAM 58 only while data processing system 10 is running the selected secondary OS application 93 under secondary OS 92. Thus, the presence of hibernation file 276 remains invisible to the user and does not consume storage space within hard disk drive 23 or RAM 58 during operation of data processing system 10 under primary OS 88.

The process proceeds from block 262 to block 264, which illustrates the hibernation process invalidating all information residing within memory regarding the state of the file system utilized to manage information within secondary storage devices, such as hard disk drive 23. For example, invalidating the file system information includes flushing all caches, buffers, allocation tables and data structures within memory that contain directory information. Flushing the file system information from memory ensures that changes to the file system made by secondary OS 92 (e.g., newly created files) will be detected by primary OS 88 when the file system information is refreshed from hard disk drive 23 and other nonvolatile storage following the restoration of primary OS 88. The process proceeds from block 264 to block 268, which depicts marking active programs and data files (program and data objects) to prevent secondary OS 92 from altering the files.

Thereafter, the process proceeds from block 268 to block 269, which illustrates determining whether the storage for the state of primary OS 88 is high-performance. The dynamic evaluation made at block 269 is based upon the speed at which the storage can restore primary OS 88 to RAM 58. Thus, if the state of primary OS 88 is stored elsewhere within RAM 58 or a high-performance hard disk drive 23, thereby indicating that the state of primary OS 88 can be restored without unacceptable user-perceived delay, the process proceeds from block 269 to block 272, which depicts storing all of the primary OS data residing in RAM 58. In contrast, if a determination is made that the storage for the state of primary OS 88 is low-performance, the process passes to block 270, which depicts minimizing the amount of primary OS data to be stored by freeing swappable memory pages within RAM 58. At block 270, dirty memory pages (i.e., swappable memory pages that have been modified) are written to swap file 278 on hard disk drive 23. According to the present invention, if the storage for the state of primary OS 88 is low-performance, discardable swappable pages of memory, that is, memory pages which have not been modified, are simply discarded since a copy of the data within the pages is already stored elsewhere, for example, within hard disk drive 23. Once the swappable memory pages have been freed, RAM 58 contains only resident memory pages, such as the state data of primary OS 88, which are required to operate data processing system 10. As will be appreciated by those skilled in the art, the advantage of storing swappable memory pages in swap file 278 when the state of primary OS 88 is to be stored within low-performance storage is that when primary OS 88 is restored subsequent to the user exiting the selected secondary OS application 93, the swappable memory pages will be demand paged back into RAM 58. Thus, memory pages which are required for operation of data processing system 10 are restored first while other pages will be paged into RAM 58 as needed. Since only a portion of the swap file pages must be paged back into RAM 58 immediately following restoration of primary OS 88, the user perceives that desktop 102 is restored to the state illustrated in FIG. 4 following the termination of the selected application without waiting for every virtual memory page within swap file 278 to be loaded into RAM 58.

Next, the process passes to block 272, which illustrates the hibernation process storing the state of primary OS 88 and the contents of registers within CPU 26 within swap file 276 on hard disk drive 23 or within RAM 58. In addition to saving the primary OS data and the CPU register contents at block 272, the hibernation process stores the configuration of each hardware component of data processing system 10. The configurations of the hardware components of data processing system 10 are preferably determined by interrogating devices coupled to planar I/O bus 68 and by transmitting an Advanced Power Management (APM) message to each additional adapter mounted within I/O slots 46. Storing the configurations of the hardware components of data processing system 10 enables the state of these components to be restored without primary OS 88 reinitializing each of these components following the restoration of primary OS 88. In a preferred embodiment of the present invention, the storage required to store the state of primary OS 88 is minimized by compressing the primary OS state data prior to storage utilizing one of a number of well-known data compression algorithms. Because accessing data from hard disk drive 23 is typically slow compared with internal calculations of CPU 26, storing compressed data within hibernation file 276, also reduces the time required to restore primary OS 88 following termination of the selected application. Thereafter, the process proceeds to block 274 and returns to FIG. 5.

Figure 7:
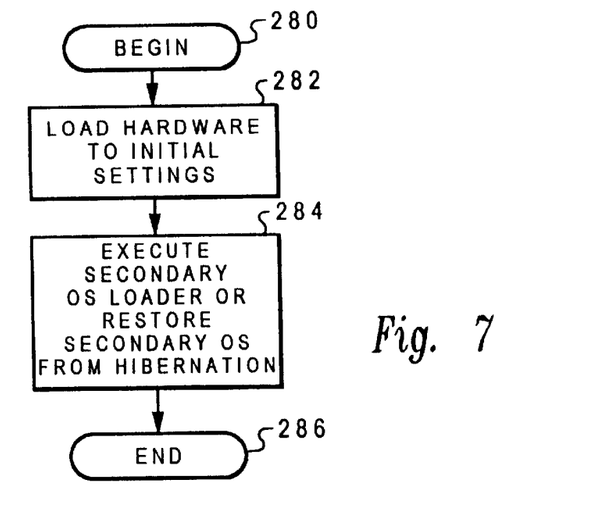
FIG. 7 is a flowchart illustrating a preferred embodiment of the method utilized by the present invention to load a secondary operating system.

Referring again to FIG. 5, the process passes from block 208 to block 210, which depicts loading secondary OS 92. The process of loading secondary OS 92 depicted at block 210 of FIG. 5 is illustrated in greater detail within FIG. 7. With reference now to FIG. 7, the process begins at block 280 and thereafter passes to block 282, which illustrates loading initial device configurations 94 from hard disk drive 23. As mentioned above, loading initial device configurations 94 places the hardware components of data processing system 10 in the initialized state expected by secondary OS 92. Thus, the hardware components of data processing system 10 are loaded with the initial settings which would result following the execution of POST without the delay attendant to performing the other functions handled by POST. The process then proceeds from block 282 to block 284, which illustrates resuming secondary OS 92 from hibernation or executing the secondary OS loader (boot strap) program to boot secondary OS 92. In a preferred embodiment of the present invention in which secondary OS 92 is resumed from hibernation, block 284 represents loading the memory image of secondary OS 92 and any active secondary OS applications 93 into RAM 58. Alternatively, in a preferred embodiment of the present invention in which secondary OS 92 is booted from hard disk 23 or other boot device, secondary OS 92 comprises a private version of a conventional operating system (e.g., Microsoft Windows™ or DOS) loaded into RAM 58 by the execution of an operating system loader program. Although a standard version of secondary OS 92 could be utilized, the use of a private version of the operating system provides several advantages. For example, initialization files such as CONFIG.SYS can be renamed to avoid confusion with the initialization files of primary OS 88 in case an interrupt occurs during the interchange of primary OS 88 and secondary OS 92. In addition, the startup process can be modified to suppress initialization notification messages and to eliminate unnecessary operations, thereby providing a rapid and transparent launch of the selected secondary OS application 93. Furthermore, because initialization files are dynamically created, applications which have mutually exclusive initialization requirements may coexist within data processing system 10.

Figure 8:
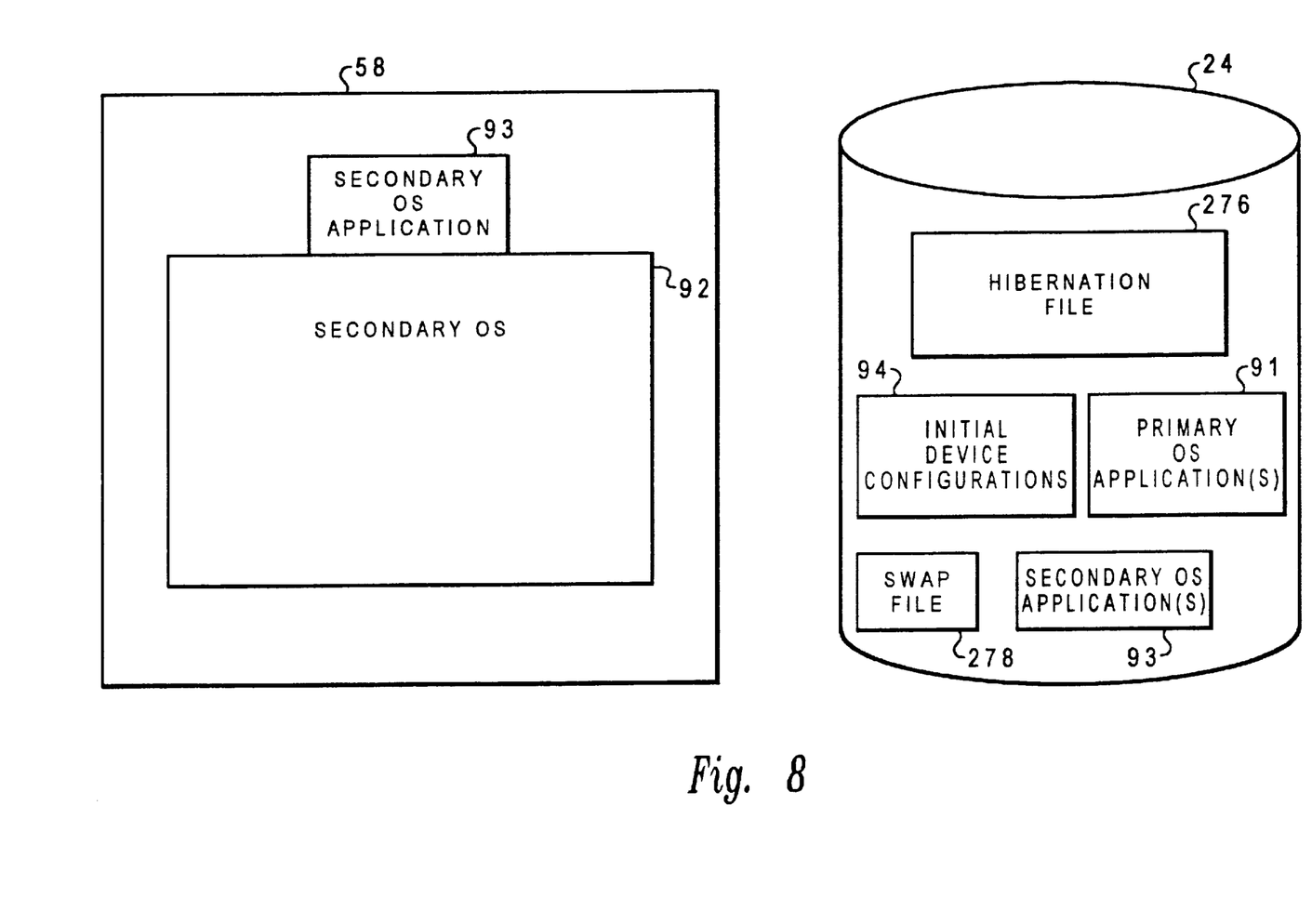
FIG. 8 depicts the software configuration of a data processing system running the secondary operating system.

Referring now to FIG. 8, there is depicted a pictorial representation of the software configuration of data processing system 10 following the loading of secondary OS 92. As depicted, secondary OS 92 is loaded into RAM 58 together with one or more secondary OS applications 93, including the selected secondary OS application 93. The state of primary OS 88 is stored either within swap file 278 on hard disk drive 23 or within RAM 58. Following the boot of secondary OS 92, the process illustrated in FIG. 7 proceeds to block 286 and returns to block 210 of FIG. 5.

Returning to FIG. 5, the process proceeds from block 210 to block 212, which illustrates data processing system 10 running the selected secondary OS application 93 under secondary OS 92. According to the present invention, the selected secondary OS application 93 is executed from a special "wrapper" shell which directs secondary OS 92 to run the selected secondary OS application 93. The wrapper shell prevents the user from invoking additional secondary OS applications 93 under secondary OS 92. Once the user quits the selected secondary OS application 93, the wrapper shell transfers control to the primary OS loader, which restores primary OS 88. For example, if the user invokes the golf game associated with golf icon 110 of FIG. 4, the user can play a round of computer golf, store score cards within hard disk drive 23, or other actions allowed by the golf game. Then, when the user quits the application, the process proceeds from block 212 to block 214, which depicts determining whether the user quit the selected secondary OS application 93 in a normal manner. If so, the process proceeds to block 218. However, if the user performed a soft reboot of data processing system 10 or cycled the power supplied to data processing system 10, the process proceeds to block 216, which illustrates data processing system 10 initiating standard startup procedures by executing POST out of ROM 86 and beginning execution of the boot strap program associated with primary OS 88. However, the boot strap program is modified to include a software hook that determines whether the designated boot device (e.g., hard disk drive 23) stores a hibernated version of primary OS 88 within swap file 278. Following the detection of primary OS 88 within swap file 278, the process then proceeds to block 218, which is illustrated in greater detail in FIG. 9.

Figure 9:
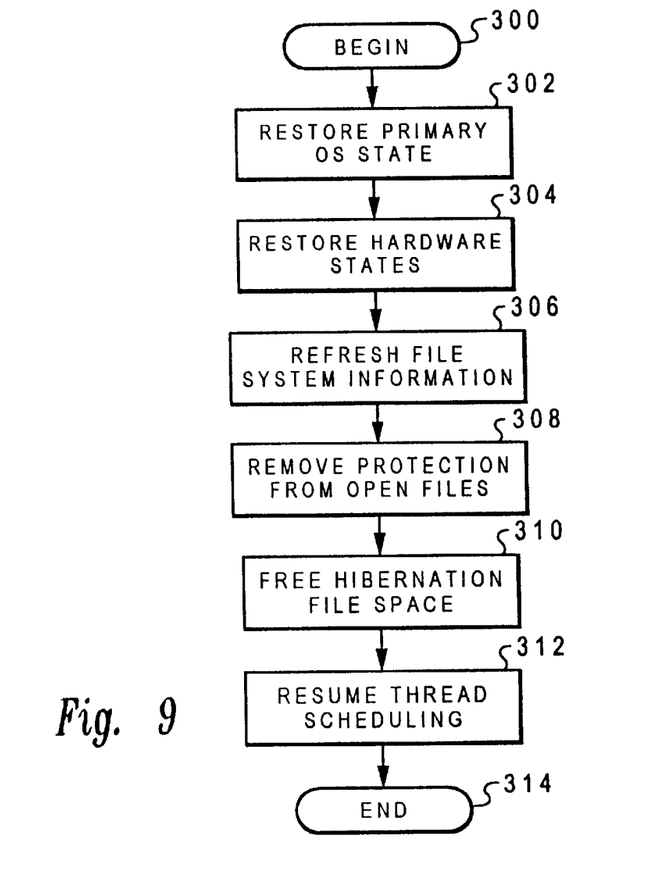
FIG. 9 is a flowchart illustrating a preferred embodiment of the method utilized by the present invention to restore the primary operating system from hibernation.

With reference now to FIG. 9, there is illustrated a flowchart of a preferred embodiment of the process utilized by the present invention to restore primary OS 88 from hibernation. The process begins at block 300 and thereafter proceeds to block 302, which depicts restoring the state of primary OS 88 from swap file 278 within hard disk drive 23 (or from RAM 58 if primary OS 88 was hibernated to RAM 58). If the storage for the state of primary OS 88 is high-performance, the state of primary OS 88 is simply loaded into RAM 58 in a single operation. However, if the storage for the state of primary OS 88 is low-performance, virtual memory pages classified as resident (and possibly a portion of the nonresident memory pages) are first loaded into RAM 58 to minimize the time required to restore primary OS 88. Thereafter, additional pages of nonresident data are demand paged in from swap file 278. Next, the hardware configurations of the hardware components of data processing system 10 are restored at block 304. The process proceeds from block 304 to block 306, which illustrates refreshing file system information within data processing system 10 from hard disk drive 23. By rebuilding the file system directories in memory from the file system information (e.g., file allocation table (FAT)) within hard disk drive 23, primary OS 88 becomes aware of changes to the file system made by secondary OS 92, for example, the addition or deletion of files. Next, at block 312, primary OS 88 removes the special file protection attributes from active objects to enable modification of the files by primary OS 88. The process then passes to block 310, which depicts freeing the disk space allocated to hibernation file 276. By removing hibernation file 276 from hard disk drive 23, the transparency of the interchange of operating systems is maintained. Finally, the process proceeds from block 310 to block 312, which illustrates primary OS 88 resuming the scheduling of threads for execution by CPU 26. The process thereafter passes to block 314 and returns to FIG. 5, where it terminates at block 220 of FIG. 5. Upon the termination of the process at block 220, the software configuration of data processing system 10 is returned to the state illustrated in FIG. 3. Consequently, screen 100 again displays the desktop scenario depicted in FIG. 4.

Although the present invention has been described with reference to a preferred embodiment in which only a single operating system is hibernated to nonvolatile storage, those skilled in the art will appreciate that multiple operating systems may be hibernated within nonvolatile storage in order to support interchange between mutually exclusive operating systems as is required by the user-selected application programs. Furthermore, those skilled in the art will understand that the primary operating system need not be a multitasking operating system having a GUI as has been described, but can be a single-threaded, command line driven operating system such as DOS.

As has been described, the present invention provides an improved method and system for executing a program within a data processing system under one of a number of mutually exclusive operating systems. According to the present invention, upon invocation of a program which requires a secondary operating system, the primary operating system is hibernated to storage and the second operating system utilized by the program is run. Following the completion of the program, the primary operating system is restored, thereby giving the user the appearance of executing the program under the first operating system. While the invention has been particularly shown and described with reference to a preferred embodiment, it will be understood by those skilled in the art that various changes in form and detail may be made therein without departing from the spirit and scope of the invention.

What is claimed is:

1. A method within a data processing system for executing a program under one of a plurality of mutually exclusive operating systems, said data processing system having a nonvolatile mass storage device, a volatile memory, and a processor, said method comprising:

in response to invocation of a program which executes under a second operating system among said plurality of operating systems while said processor is executing a first operating system among said plurality of operating systems, automatically performing the steps of:

causing said data processing system to achieve a quiescent state;

determining a state of said first operating system from contents of said volatile memory;

storing said state of said first operating system within either said volatile memory or said nonvolatile mass storage device;

loading at least a portion of said second operating system into said volatile memory in response to said storage of said state of said first operating system; and thereafter, executing said program under said second operating system, wherein executing said program under said second operating system comprises executing said program from a shell that constrains said second operating system such that another program cannot be invoked under said second operating system until after control is returned to said first operating system.

2. The method of claim 1, said method further comprising:
freeing portions of said volatile memory allocated to said first operating system prior to storing said state of said first operating system only if said state is to be stored within said nonvolatile mass storage device.

3. The method of claim 1, said method further comprising:
determining if storage of said state of said first operating system within either said nonvolatile mass storage device or said volatile memory is possible; and
in response to a determination that storage of said state of said first operating system is not possible, advising a user to abort execution of said program.

4. The method of claim 1, wherein said state of said first operating system includes an indication of a state of active applications running under said first operating system.

5. The method of claim 1, wherein said first operating system is a multitasking operating system which subdivides each program to be executed into one or more threads, said first operating system including one or more device drivers which interface between said first operating system and hardware components of said data processing system, wherein said step of causing said data processing system to achieve a quiescent state comprises:

halting scheduling of threads to said processor for execution; and suspending execution of said one or more device drivers.

6. The method of claim 1, wherein said data processing system utilizes a file system to organize information stored within said nonvolatile mass storage device, said method further comprising:

prior to storing said state of said first operating system, invalidating file system information, residing within said volatile memory, that specifies locations of files within said nonvolatile mass storage device.

7. The method of claim 1, said method further comprising:
following invocation of said program and prior to said storing step, creating a file within said nonvolatile mass storage device in which to store at least a portion of said state of said first operating system.

8. The method of claim 1, said method further comprising:
prior to said storing step, compressing said state of said first operating system.

9. The method of claim 1, and further comprising:
marking each active program running under said first operating system with an attribute which prevents modification of said each active program by said second operating system or said program.

10. The method of claim 1, said method further comprising:

in response to reset of said data processing system, executing a Power On Self Test (POST) Procedure to initialize hardware components of said data processing system to their initial states;

after executing said POST procedure, storing said initial states of said hardware components; and subsequent to said storing step and prior to said executing step, accessing said initial states of said hardware components and utilizing the stored initial states to set said hardware components of said data processing system to their initial states.

11. The method of claim 1, said method further comprising:

thereafter, exiting said second operating system; and
restoring said state of said first operating system to said volatile memory.

12. The method of claim 11, said method further comprising:

after exiting said second operating system, loading file system information from said nonvolatile mass storage device to said volatile memory.

13. A data processing system that supports execution of a program under one of a plurality of mutually exclusive operating systems, said data processing system comprising:

means for invoking a program that executes under a second operating system among said plurality of operating systems while said processor is executing a first operating system among said plurality of operating systems;

responsive to said invocation of said program,
means for causing said data processing system to achieve a quiescent state;

means for determining a state of said first operating system from contents of said volatile memory;

means for storing said state of said first operating system within either said volatile storage or said nonvolatile mass storage device;

means for automatically loading at least a portion of said second operating system into said volatile memory in response to said storage of said state of said first operating system; and means for thereafter executing said program under said second operating system, wherein said means for executing said program comprises means for executing said program from a shell that constrains said second operating system such that another program cannot be invoked under said second operating system until after control is returned to said first operating system.

14. The data processing system of claim 13, and further comprising:

means for freeing portions of said volatile memory allocated to said first operating system prior to storing said state of said first operating system only if said state is to be stored within said nonvolatile mass storage device.

15. The data processing system of claim 13, and further comprising:

means for determining if storage of said state of said first operating system within either said volatile storage or said nonvolatile mass storage device is possible; and means for advising a user to abort execution of said program in response to a determination that storage of said state of said first operating system is not possible.

16. The data processing system of claim 13, wherein said state of said first operating system includes an indication of a state of active applications running under said first operating system.

17. The data processing system of claim 13, wherein said first operating system is a multitasking operating system which subdivides each program to be executed into one or more threads, said first operating system including one or more device drivers which interface between said first operating system and hardware components of said data processing system, wherein said means for causing said data processing system to achieve a quiescent state comprises:

means for halting scheduling of threads to said processor for execution; and means for suspending execution of said one or more device drivers.

18. The data processing system of claim 13, wherein said data processing system utilizes a file system to organize information stored within said nonvolatile mass storage device, said system further comprising:

means for, prior to storing said state of said first operating system, invalidating file system information residing within said volatile memory, wherein said file system information specifies locations of files within said nonvolatile mass storage device.

19. The data processing system of claim 13, said system further comprising:

means for, following invocation of said program, creating a file within said nonvolatile mass storage device in which to store at least a portion of said state of said first operating system.

20. The data processing system of claim 13, said system further comprising:

means for compressing said state of said first operating system prior to storing said state of said first operating system.

21. The data processing system of claim 13, and further comprising:

means for marking each active program running under said first operating system with an attribute which prevents modification of said each active program by said second operating system or said program.

22. The data processing system of claim 13, said system further comprising:

means, responsive to reset of said data processing system, for executing a Power On Self Test (POST) procedure to initialize hardware components of said data processing system to their initial states;

means for, after execution of said POST procedure, storing said initial states of said hardware components;

means for, subsequent to storing said state of said first operating system and prior to executing said program, for accessing said initial states of said hardware components; and means for setting hardware components of said data processing system to their initial states utilizing said accessed initial states.

23. The data processing system of claim 13, said system further comprising:

means for thereafter exiting said second operating system; and means for restoring said state of said first operating system to said volatile memory.

24. The data processing system of claim 23, said system further comprising:

means for, after exiting said second operating system, loading file system information from said nonvolatile mass storage device to said volatile memory.

25. A computer program product within a data processing system readable media for causing a data processing system to execute a program under one of a plurality of mutually exclusive operating systems, said data processing system including a nonvolatile mass storage device, a volatile memory, and a processor, said computer program product comprising:

instruction means for causing said data processing system to invoke a program that executes under a second operating system among said plurality of operating systems while said processor is executing a first operating system among said plurality of operating systems;

responsive to said invocation of said program, instruction means for causing said data processing system to achieve a quiescent state;

instruction means for causing said data processing system to determine a state of said first operating system from contents of said volatile memory;

instruction means for causing said data processing system to store said state of said first operating system within either said volatile memory or said nonvolatile mass storage device;

instruction means for causing said data processing system to automatically load at least a portion of said second operating system into said volatile memory in response to said storage of said state of said first operating system; and instruction means for thereafter causing said data processing system to execute said program under said second operating system, wherein said instruction means for thereafter causing said data processing system to execute said program comprises instruction means for causing said data processing system to execute said program from a shell that constrains said second operating system such that another program cannot be invoked under said second operating system until after control is returned to said first operating system.

26. The computer program product of claim 25, and further comprising:

instruction means for causing said data processing system to free portions of said volatile memory allocated to said first operating system prior to storing said state of said first operating system only if said state is to be stored within said nonvolatile mass storage device.

27. The computer program product of claim 25, and further comprising:

instruction means for causing said data processing system to determine if storage of said state of said first operating system within either said volatile memory or said nonvolatile mass storage device is possible; and instruction means for causing said data processing system to advise a user to abort execution of said program in response to a determination that storage of said state of said first operating system is not possible.

28. The computer program product of claim 25, wherein said state of said first operating system includes an indication of a state of active applications running under said first operating system.

29. The computer program product of claim 25, wherein said first operating system is a multitasking operating system which subdivides each program to be executed into one or more threads, said first operating system including one or more device drivers which interface between said first operating system and hardware components of said data processing system, wherein said instruction means for causing said data processing system to achieve a quiescent state comprises:

instruction means for causing said data processing system to halt scheduling of threads to said processor for execution; and instruction means for causing said data processing system to suspend execution of said one or more device drivers.

30. The computer program product of claim 25, wherein said data processing system utilizes a file system to organize information stored within said nonvolatile mass storage device, said computer program product further comprising:

instruction means for causing said data processing system to invalidate file system information residing within said volatile memory prior to storing said state of said first operating system, wherein said file system information specifies locations of files within said nonvolatile mass storage device.

31. The computer program product of claim 25, and further comprising:

instruction means for causing said data processing system to create a file within said nonvolatile mass storage device in which to store said state of said first operating system following invocation of said program.

32. The computer program product of claim 25, and further comprising:

instruction means for causing said data processing system to compress said state of said first operating system prior to storage of said state of said first operating system.

33. The computer program product of claim 25, and further comprising:

instruction means for causing said data processing system to mark each active program running under said first operating system with an attribute which prevents modification of said each active program by said second operating system or said program.

34. The computer program product of claim 25, and further comprising:

instruction means for causing said data processing system to set hardware components of said data processing system to their initial states subsequent to storing said state of said first operating system, wherein said instruction means for causing said data processing system to set hardware components to their initial states comprises instruction means for causing said data processing system to access initial states of said hardware components following Power On Self Test (POST) from said nonvolatile mass storage device.

35. The computer program product of claim 25, and further comprising:

instruction means for causing said data processing system to thereafter exit said second operating system; and instruction means for causing said data processing system to restore said state of said first operating system to said volatile memory.

36. The computer program product claim 35, and further comprising:

instruction means for causing said data processing system to load file system information from said nonvolatile mass storage device to said volatile memory after exiting said second operating system.

37. The method of claim 1, wherein said first operating system and said second operating system utilize different operating system initialization files, said method further comprising executing one or more operating system initialization files of said second operating system prior to said step of executing said program.

38. The data processing system of claim 13, wherein said first operating system and said second operating system utilize different operating system initialization files, wherein one or more operating system initialization files of said second operating system are executed prior to executing said program.

39. The computer program product of claim 25, wherein said first operating system and said second operating system utilize different operating system initialization files, said computer program product further comprising instruction means for causing said data processing system to execute one or more operating system initialization files of said second operating system prior to executing said program.

40. The method of claim 1, and further comprising determining whether or not said program executes under said second operating system by interrogating an attribute of an icon associated with said program.

41. The data processing system of claim 13, and further comprising:

a display device that displays an icon representing said program; and means for determining whether or not said program executes under said second operating system by interrogating an attribute of an icon associated with said program.

42. The computer program product of claim 25, wherein said data processing system includes a display device that can display an icon representing said program, said computer program product further comprising instruction means for causing said data processing system to determine whether or not said program executes under said second operating system by interrogating an attribute of said icon.

* * * * *